Figure 1:
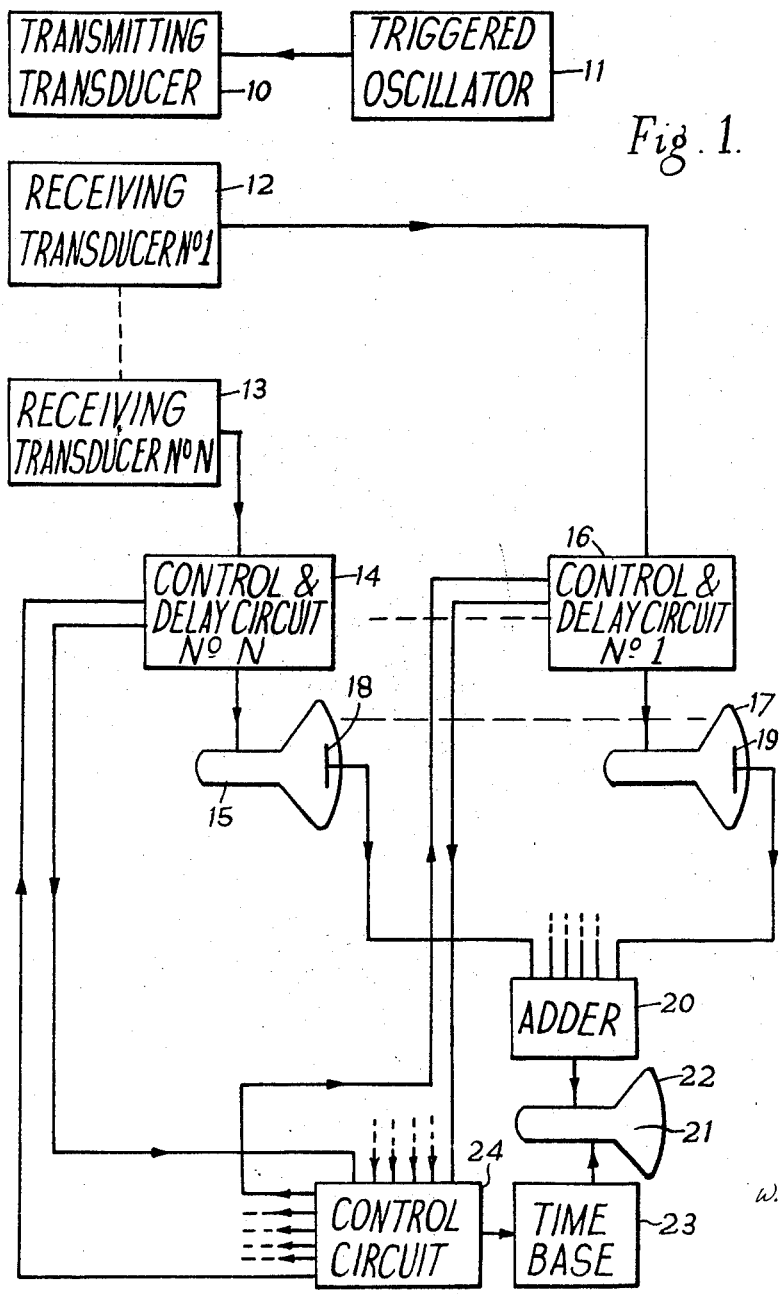

July 20, 1965 W. HALLIDAY 3,196,383
PULSE-RESPONSIVE APPARATUS
Filed Nov. 9, 1962 5 Sheets-Sheet 1

W. HALLIDAY
INVENTOR

BY
ATTORNEYS

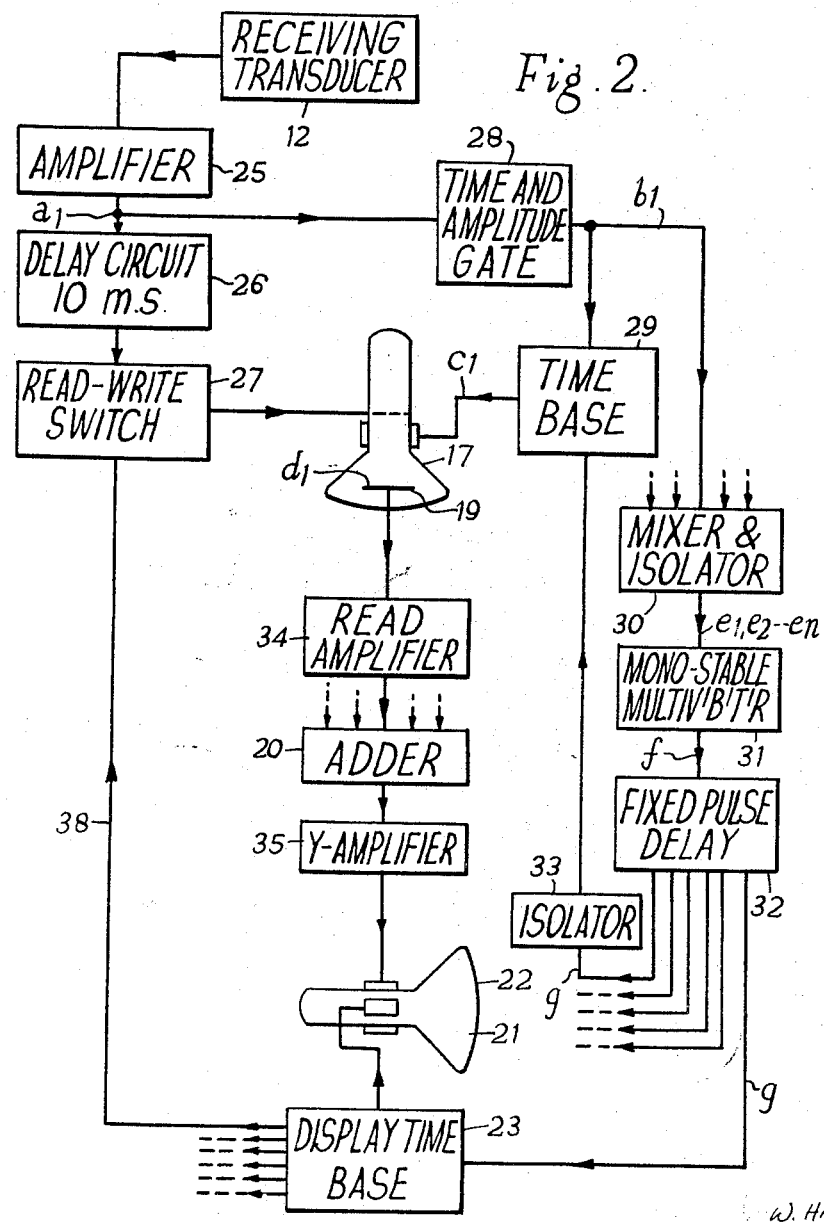

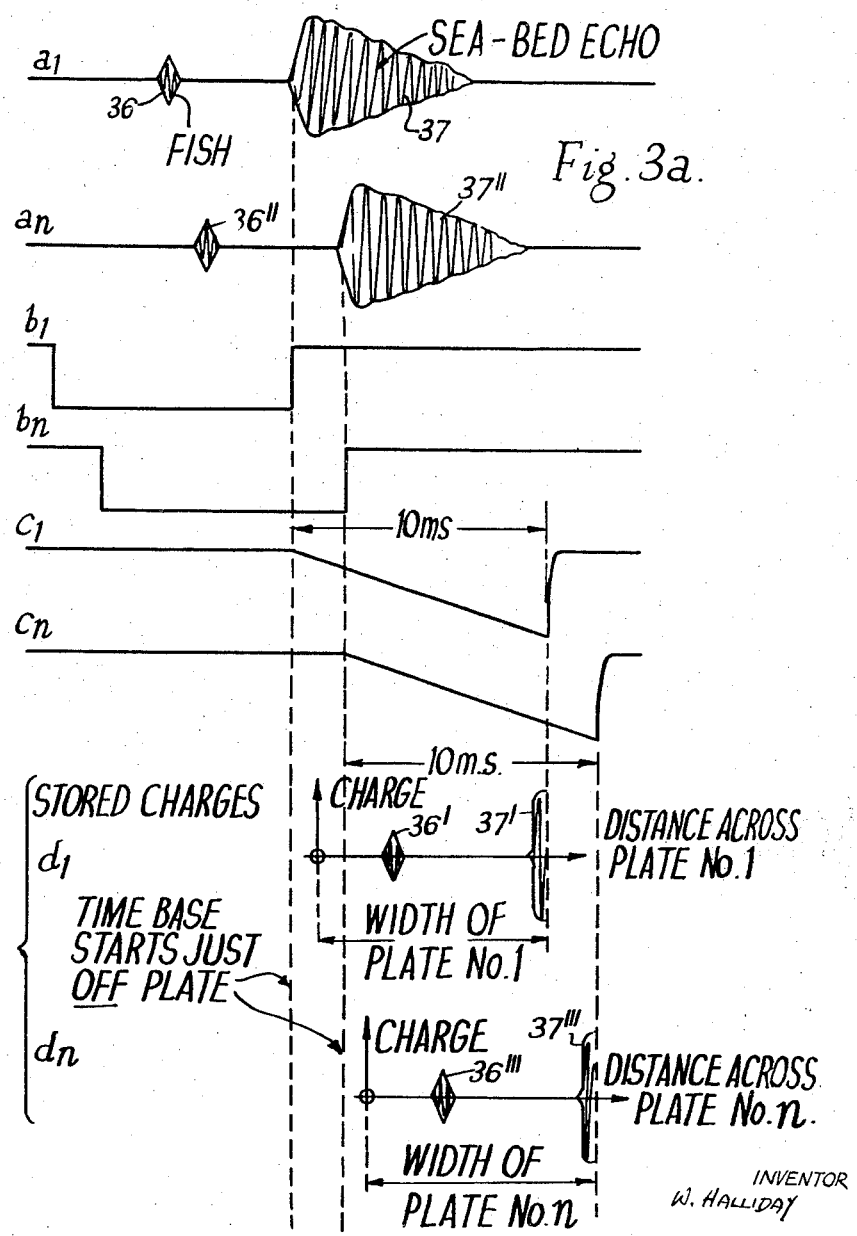

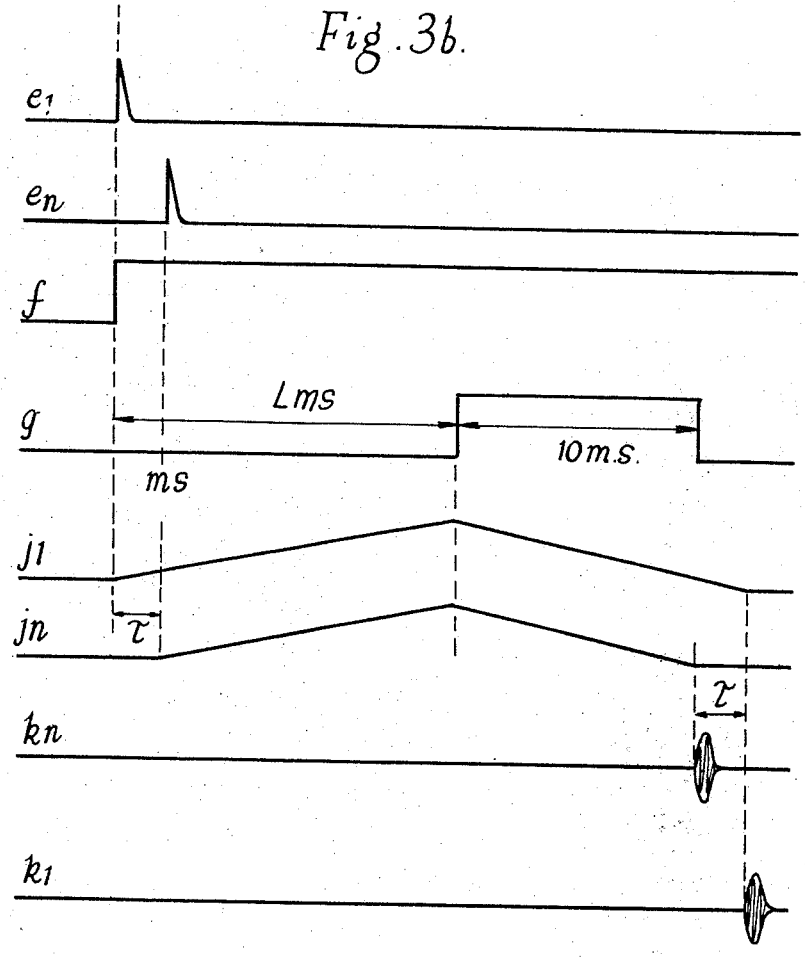

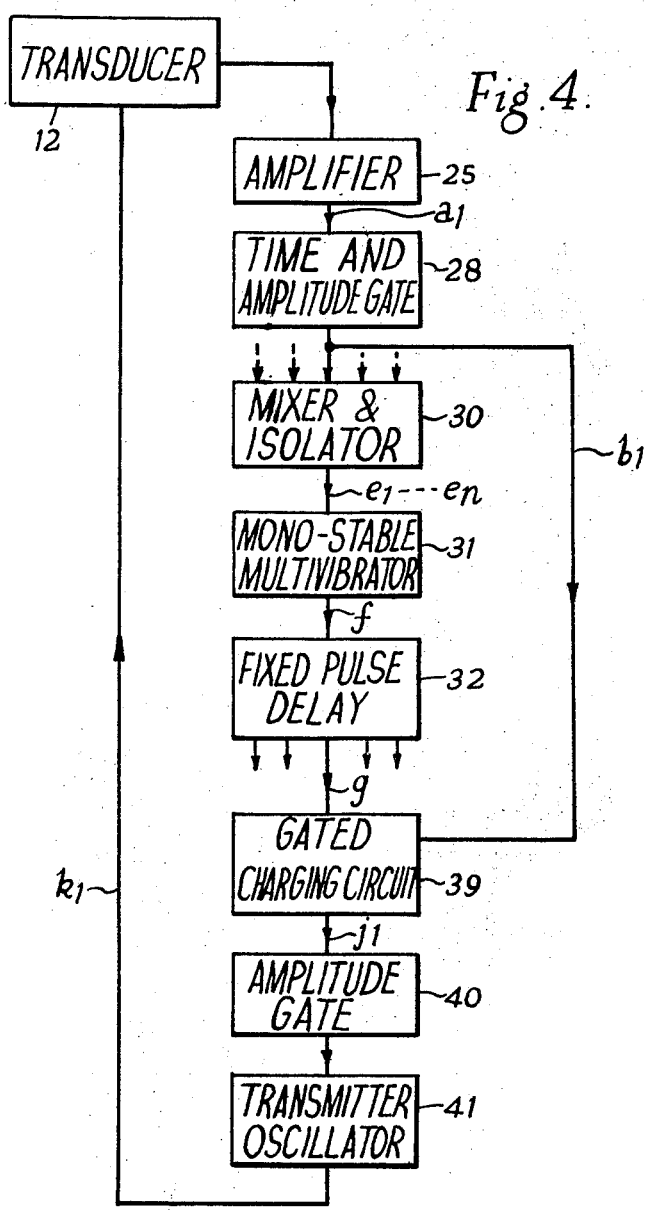

3,196,383
PULSE-RESPONSIVE APPARATUS
William Halliday, London, England, assignor to S. Smith
 & Sons (England) Limited, London, England, a British
 company
Filed Nov. 9, 1962, Ser. No. 236,509
11 Claims. (Cl. 340—3)

The present invention relates to pulse-responsive apparatus and is concerned particularly, but not exclusively, with fish detecting apparatus of the type comprising means for transmitting pulses of pressure waves into the sea from a vessel, a receiving transducer system for receiving echoes reflected from objects in the sea and from the sea bed, and display apparatus for displaying indications of echoes.

In order to take account of rolling and pitching of vessels equipped with such apparatus, it is normally arranged that the transmitting and receiving means are capable of transmitting and receiving energy over wide angles. This has the disadvantage, however, that a display of echoes at a given range is not always indicative of fish vertically below the vessel. In deep sea trawling particularly, the information most needed is the height of fish above the sea bed, but the display provided by wide beams makes it impossible to distinguish between fish vertically below the vessel and fish to one side but at the same range. Narrow beam transmission or reception would improve accuracy in this respect in still water, but a swell or rough sea causing rolling and pitching of the vessel would render the apparatus less effective than the usual wide beam apparatus.

It could, of course, be arranged to mount the transmitter, or receiver, or both, or a common transmitter-receiver where this is used, upon a gyro-stabilized platform so that irrespective of rolling and pitching of the vessel the direction of transmission, or reception, or both, is always vertical. Narrow beam apparatus could then be more usefully employed to improve accuracy.

Such an installation would, however, be costly.

It is one object of the present invention to provide apparatus whereby narrow beam transmission or reception, or both, can be achieved in apparatus of the type specified without the need for gyro-stabilizing mechanisms.

According to one aspect of the present invention, therefore, in apparatus of the type specified, the receiving transducer system has a plurality of spaced receiving elements connected to individual receiving channels, and control means connected to the different channels and responsive to an echo signal from the sea bed beneath the vessel and received by the different receiving elements at instants related to the relative inclinations of the vessel and the sea bed for determining a preferred effective direction of transmission, or reception, or both, of pulses of pressure waves relative to the sea bed beneath the vessel.

In one form of the invention, a transmitter is arranged to transmit in a wide beam whereby transmitted pulses reach the nearest point on the sea bed irrespective of pitching and rolling of the vessel. The control means are then employed to determine solely the preferred effective direction of reception. This may be achieved in different ways. For example it may be arranged to transmit an auxiliary pulse before each main pulse. This auxiliary pulse must have a different frequency from that of the main pulse and therefore a separate transmitter and receiver is required for this auxiliary pulse. By examining the times of arrival of the echo signal from the sea bed received on different elements of an auxiliary receiving transducer, storage devices, e.g. cathode ray tubes, may be used to give the required directionality. The information received by the reflection of the auxiliary pulse is used to switch on each of the storage devices in turn. For example, where cathode ray tubes are being employed, the auxiliary pulse reflections are used to switch on the time bases of each of the C.R.T.'s in turn. The stored information of echoes from the main pulse is later scanned off from all these storage devices simultaneously.

One preferred embodiment comprises means in each channel for delaying echo signals from the receiving element of the channel, the delays in the different channels being equal, further means in each channel responsive to an echo signal from the sea bed for setting storage mechanism into operation for storing the delayed signals in a storage device individual to the channel, and reproducing means for scanning the several storage devices in such a manner as to add together all echo signals which were stored at like instants relative to the reception of their associated sea bed echo signals. Thus all corresponding echo signals received by the different elements and co-directional with the echo signals from the sea bed are combined additively, whereas other echo signals are not. For example, assuming the receiving elements to be arranged in a straight line which at a given instant is inclined to the horizontal due to rolling and assuming the sea bed to be horizontal, all echo signals from objects vertically below the receiving transducer would be combined additively.

Echo signals from an object lying in a direction at right-angles to the line of the receiving elements would be received in phase and hence would be stored at different instants relative to the sea bed echo signals. Thus these echo signals would not be combined additively by the scanning device.

The output of the reproducing means can be in the form of a record or a transient display.

If the sea bed is very irregular consisting of sharp peaks, the control means may act irregularly causing the preferred direction to sweep in dependence upon the peak which happens to be at the closest range. However, as trawling is not normally carried out over such a sea bed, this is not a significant disadvantage.

In another preferred embodiment, the echo signals received on the separate receiving elements are used to control the phase of transmission pulses applied to excite the same or corresponding elements in such a manner as to cause the transmitting beam to be steered towards that part of the sea bed which is at closest range.

The invention is not limited, however, to the detection of fish by echo sounding since the concept in the last preceding paragraph is equally applicable to secondary radar systems. By means of an array of receiving elements on, say, an aircraft with associated transmitting channels a pulse of radio-frequency energy can be radiated in the direction from which an interrogating pulse is received.

According to another aspect of the invention, therefore, a responder adapted to transmit a pulse of energy in a given direction in response to the reception of a pulse of energy from the given direction, comprises an array of receiving elements with associated receiving channels respectively coupled to corresponding transmitting channels, each transmitting channel including a timing device adapted to be triggered for operation from a datum condition by a signal received in the associated receiving channel, and to be reversed by a further signal delayed by a fixed time relative to the instant of reception of the said signal in the first channel to receive it, and means responsive to the return of the timing device in each transmitting channel to its datum condition to initiate the transmission of pulse of energy from the transmitting channel.

The invention will now be described, by way of example, with reference to the accompanying drawings, in which FIG. 1 is a block schematic diagram of apparatus for detecting fish, FIG. 2 is a diagram in more detail of part of FIG. 1, FIGS. 3a and 3b are explanatory waveform diagrams, and FIG. 4 is a block schematic diagram of part of further apparatus for use in detecting fish.

Referring to FIG. 1, a transmitting transducer 10 is excited by a triggered oscillator 11 in known manner to transmit pulses of ultrasonic pressure waves into the sea from a vessel (not shown in the drawings). The transmitting transducer is arranged to transmit the pressure waves in a wide beam so that the nearest point on the sea bed is reached by the pressure waves irrespective of the normal rolling and pitching of the vessel.

For receiving echo signals from fish and from the sea bed, an array of transducers or separate receiving elements are provided of which only two are shown at 12 and 13. It will be assumed initially that the receiving transducers are in a linear array and that the array extends athwartships and is horizontal when the vessel is horizontal.

Each receiving transducer has a receiving channel individual thereto comprising a control and delay circuit and a storage device which is conveniently a cathode ray tube store. The control and delay circuit for the first receiving transducer 12 is shown at 16 with its associated cathode ray tube store at 17, and correspondingly at 14 and 15 for the $n^{th}$ receiving transducer 13.

The output electrodes 18 and 19 of the two cathode ray tube stores 15 and 17 are connected, with the output electrodes of the other cathode ray tube stores (not shown), to an adder 20 whose output is connected to a further cathode ray tube provided with a fluorescent screen 22 for displaying echo signals.

A time base circuit 23 for the cathode ray tube 21 is controlled by a control circuit 24 connected to the control and delay circuits in the channels individual to the receiving transducers.

In operation a pulse of ultrasonic pressure waves is transmitted from the transmitting transducer 10 into the sea causing echoes from fish and from the sea bed.

The echoes are received on the transducers of the array and passed into the control and delay circuits of the respective receiving channels. Each of these circuits provides a fixed delay which in the present embodiment is conveniently of 10 milliseconds in each channel, and the sea-bed echo in each channel is used in a circuit bypassing the delay circuit to trigger the time base circuit of the cathode ray tube store in the channel for storing the received echoes from fish and the sea bed.

The control circuit 24 then automatically comes into operation, as will be described later, to actuate the time base circuit 23 and at the same time to cause the storage plates in the cathode ray tube stores to be scanned simultaneously. The outputs from the output electrodes of the cathode ray tube stores are combined in the adder 20 and thence applied to the cathode ray tube 21 on the screen of which they are displayed.

It will be appreciated that coincident signals applied to the adder 20 are combined additively and hence reinforce one another and produce a strong resultant in the display whereas other signals produce relatively insignificant displays.

In this embodiment the only reproduced echo signals which are coincident in the adder 20 when the sea bed is horizontal are echo signals from targets on or near the vertical below the transducers, as will now be described.

With the vessel horizontal and above a horizontal sea bed, all echoes from targets on or near the vertical reach the receiving transducers simultaneously. Each echo signal suffers a 10 milliseconds delay, and hence each occupies the same position on its associated storage plate relative to the beginning of the scan over the storage plate.

Thus, on simultaneous reproduction of the stored signals all such echo signals combine additively and thereby reinforce each other.

Considering now the case of echoes from targets appreciably removed from the vertical and to one side of the ship, such echoes reach the transducers in succession. Thus, with respect to the beginnings of the scans over the respective storage plates, these echo signals are progressively further away from the beginning of the scan.

It will be appreciated that when all storage plates are scanned simultaneously these stored echo signals will be reproduced in succession and hence will not reinforce each other to produce to strong display.

If now the vessel rolls from the horizontal, the echoes from the targets on or near the vertical reach the receiving transducers in succession, but the bottom echoes do likewise and hence the relationship between their storage positions and the beginnings of the respective scans remains undisturbed whereby the preferred direction of reception remains the vertical. The effective beam width is, of course, dependent upon the number of receiving transducers and their spacing as will be understood by those skilled in the art.

If the sea bed should be sloping, the preferred direction becomes centered on a line which is vertical to the sea bed and passes through the array of receiving transducers.

A more detailed description of the arrangement of FIG. 1 will now be given with reference to FIG. 2 which is a block circuit diagram of one receiving channel, namely that channel for transducer No. 1, together with apparatus common to all the receiving channels.

The control and delay circuit 16 of FIG. 1 is constituted in FIG. 2 by an amplifier 25, a delay circuit 26, a read/write switch 27, a time-and-amplitude gate 28 and a time base 29 for the cathode ray tube store 17.

The control circuit 24 of FIG. 1 is constituted in FIG. 2 by a mixer and isolator 30, a mono-stable multivibrator 31, a fixed pulse-delay circuit 32 and an isolator 33, further isolators 33 (not shown) being provided, there being one for each cathode ray tube store.

Additionally a read-amplifier is shown connected to the output element of the storage plate 19 of the cathode ray tube store 17, and a Y-amplifier 35 is connected between the adder 20 and the Y-deflection coils of the display tube 21.

The signals and voltages present at the points marked $a_1$, $b_1$, $c_1$, $d_1$, $e$, $f$ and $g$ in FIG. 2 are shown by curves of like reference in FIGS. 3a and 3b. In all these curves, except $d_1$, the ordinate represents voltage and the abscissa represents time. In the curve $d_1$ the ordinate represents stored charge and the abscissa represents distance across the storage plate 19 in the tube 17.

In FIG. 2 the output of the receiving transducer 12 is amplified by the amplifier 25. It will be assumed as an example that a received signal consists of an echo signal 36 from fish and the sea-bed echo 37 (FIG 3a, curve $a_1$) which appear in the output of the amplifier 25.

These signals are applied directly to the time and amplitude gate 28 which functions in known manner to select the steep-fronted sea-bed echo signal of relatively large amplitude and, in response to a portion of this signal exceeding a given amplitude level, passes a triggering voltage shown by curve $b_1$ in FIG. 3a to the time base 29, and produces a ten-millisecond ramp as shown by the curve $c_1$ in said FIG. 3a. The output of gate 28 is also applied to the mixer and isolator 30 where it is mixed with the outputs from the corresponding time and amplitude gates in the other channels. The voltage shown by curve $b_1$ in FIG. 3a will be seen to have a voltage step occurring slightly after the beginning of the sea-bed echo.

The mixer and isolator 30 is responsive solely to the step in the voltage $b_1$ to produce a voltage spike as shown in curve $e_1$ of FIG. 3b, which is applied to trigger the mono-stable multivibrator 31. A voltage step is produced by the multivibrator 31 as shown by the curve $f$ in FIG. 3b. Corresponding voltage spikes such as $e_n$ (FIG. 3b) are produced from the bottom echo received by the other transducers, but the mono-stable multivibrator 31 responds only to the first, which, in this instance, is the spike $e_1$.

This is delayed by a small amount (L milliseconds, curve $g$, FIG. 3b) by the fixed pulse-delay circuit 32 to produce the delayed voltage step shown in curve $g$ of FIG. 3b and after passing through the isolator circuit 33 is applied to trigger the time base circuit 29 again for the cathode ray tube store 17. This provides a second delayed 10-millisecond ramp (not shown).

Referring again to the amplifier 25, a second output therefrom is applied to the delay circuit 26 providing a delay of 10 milliseconds equal to the time base provided by the time base circuit 29. From the output of the delay circuit 26 the signal is applied through the read/write switch 27 to the control grid of the cathode ray tube store 17. It is arranged, as will be described later, that the read/write switch is so controlled from the display time base 23 as initially to switch the delayed received signals to the store 17 during the first or storage sweep, and later to provide a steady bright-up voltage for reproduction and display during the delayed sweep.

Thus the signals of curve $a_1$ are stored during the write or storage phase as illustrated by the curve $d_1$ of FIG. 3a. From this curve it will be seen that the sweep of the beam begins just off one edge of the storage plate and ends just off the opposite edge of the storage plate. During the sweep, the fish echo 36 is stored at 36' and the sea-bed echo is stored at 37'.

The signals received on the other receiving transducers are stored in like manner on the storage plates in the cathode ray tube stores of the respective channels.

Thus all fish echo signals equally-spaced in time from their respective sea-bed echo signals are stored at corresponding locations on their respective storage plates.

On the assumption that the sea-bed is horizontal and the array of receiving transducers is horizontal when the vessel carrying them is horizontal, the arrangement described would provide a preferred direction which is vertical. Curves $a_n$, $b_n$, $c_n$ and $d_n$ of FIG. 3a are the curves corresponding to $a_1$, $b_1$, $c_1$ and $d_1$ for the $n^{th}$ receiving transducer of the array when the vessel has rolled from the horizontal.

It will be seen from the curve $d_n$ that despite rolling the echo signals 36'' and 37'' corresponding to 36 and 37 of the curve $a_1$ are stored at locations 36''' and 37''' corresponding to 36' and 37' of the curve $d_1$.

Referring again to the display time base 23, this is controlled by the voltage step of curve $g$ (FIG. 3b). This step is delayed by a fixed amount L milliseconds after the first triggering signal $b_1$ applied to any of the storage time base circuits 29. The delay L is so chosen as to allow all storage to be completed under normal conditions.

Thus, after storage is complete, the display time base is triggered and at the same instant the trigger pulse $g$ is applied to trigger the storage time bases 29 simultaneously in all channels whereby the storage plates in all stores are scanned simultaneously. It is further arranged that throughout the sweep of the display time base 23 a control signal is transmitted over the connection 38 to the read/write switches 27 in all channels, causing these switches to apply a fixed bright-up or read voltage to the control grids of all the cathode ray tube stores.

Thus reading is effected and the output signals from the stores are combined in the adder 20 and passed through the Y-amplifier 35 to the display tube 21.

It will be appreciated that by progressively varying the delays provided by the delay circuits 26 from channel to channel to preferred direction over a horizontal sea bed can be made other than vertical.

Referring now to FIG. 4, this is a block schematic diagram of an arrangement which can be used alternatively, or in addition to the embodiment just described, for determining a preferred direction of transmission. In FIGS. 1, 2 and 4 like parts have the same reference.

In FIG. 4 a charging circuit 39 is gated by the waveform $b_1$ in such a manner that charging commences with the positive-going step of $b_1$. The delayed voltage step $g$ is also applied to the charging circuit 39 to arrest the charging phase and initiate a discharging phase at the same rate of change of charge.

An amplitude gate 40 is connected to the charging circuit 39, and when the charge returns to zero the gate 40 applies a trigger signal to a transmitter oscillator 41 which applies a pulse of ultrasonic oscillations to the transducer 12. Thus the transducer 12 acts as a receiving and a transmitting transducer in this embodiment.

Each receiving channel is connected as just described to a corresponding charging circuit 39, amplitude gate 40 and transmitter oscillator 41. Considering now the case in which the vessel is horizontal, and the seat bed is horizontal all the transducers receive the sea-bed echo simultaneously; and hence charging and discharging in the gated charging circuits occurs in unison whereby all the transmitter oscillators 41 are triggered simultaneously to provide a preferred direction of vertical.

Assuming now that the vessel rolls, the charging circuits will start charging in succession as the sea-bed echo is received on the transducers in succession. The instant of changeover from charge to discharge is however the same for all channels whereby the transducer which is the last to receive the sea-bed echo transmits its pulse of oscillations first and the first to receive the sea-bed echo transmits its pulse of oscillations last, the timing being such as to maintain the preferred direction of transmission on the vertical.

Curves $j_1$ and $k_1$ of FIG. 3b corresponding to the voltages at $j_1$ and $k_1$ in FIG. 4 illustrate respectively the change of charge occurring in the gated charging circuit 39 and the output from the oscillator 41. Curves $j_n$ and $k_n$ represent the corresponding voltages in the $n$th channel with the vessel in a roll. It will be seen that the time $\tau$ between the gating of the charging circuits in the two channels equals the time $\tau$ between the triggering of the two transmitter oscillators.

If the vessel passes over a sloping sea bed the preferred direction of transmission automatically changes from the vertical towards the normal to the sea bed.

If the rate of charge and discharge in the circuit 39 should be varied progressively from channel to channel, the preferred direction can be caused to deviate from the normal to the sea bed.

Where the arrangement of FIG. 4 supplements the arrangement of FIG. 2 there is a preferred direction of transmission and a preferred direction of reception which would, of course, normally be arranged to coincide precisely.

It can however be arranged that there is a preferred direction of transmission by means of the apparatus described with reference to FIG. 4, but that reception is over a wide angle.

To achieve this, a separate receiving transducer or transducer system can be used, or a selected one or group of the transducers used to control the direction of transmission may be connected to a display device or pen recorder or both.

The display device and the recorder could be operated in the same manner as the cathode ray tube stores described with reference to FIG. 2 utilizing the sea-bed echo as a trigger and delaying the received echoes appropriately. A suitable triggered pen recorder is described in British patent specification No. 852,566.

A more detailed description of a suitable triggering and delay circuit for use with the cathode ray tube stores and with the last-mentioned display device is to be found in British patent specifications Nos. 785,001 and 839,131.

Although, in the embodiments described, pulses used for exploration and display are also used to control the display or the transmitted pulses or both, it can alternatively be arranged for this purpose to use an auxiliary echo sounder working on a different frequency from that of the main echo sounder. The sea-bed echo signals received on the receiving transducers of the auxiliary echo sounder could then be used to control storage and reproduction of echo signals in the main echo sounder to give a preferred direction of reception. Alternatively or additionally the auxiliary echo sounder could be used to control the transmission of pulses by the main echo sounder to give a preferred direction of transmission.

Furthermore, although for the purposes of explanation a simple linear array has been described, the array will usually be two-dimensional to give stabilization of the beam during both rolling and pitching.

I claim:

1. In apparatus for detecting fish comprising
means for transmitting pulses of pressure waves into the sea beneath a vessel,
a receiving transducer system to receive echo signals from fish and the sea bed,
display apparatus,
and means connecting the display apparatus to said receiving transducer system to display indications of echoes from said fish and sea bed,
the provision of
a plurality of separate receiving channels,
a plurality of receiving elements in said receiving transducer system,
means connecting said receiving elements to said channels respectively,
directivity control means,
and means connecting said directivity control means to all said channels, said directivity control means being responsive to a sea bed echo signal received in said receiving channels at instants related to the relative inclinations of said vessel and said sea bed to determine and stabilize the directivity of the apparatus relative to the sea bed.

2. In apparatus for detecting fish comprising
means for transmitting pulses of pressure waves into the sea beneath a vessel,
a receiving transducer system to receive echo signals from fish and the sea bed,
display apparatus,
and means connecting the display apparatus to said receiving transducer system to display indications of echoes from said fish and sea bed,
the provision of
a plurality of separate receiving channels,
a plurality of receiving elements in said receiving transducer system,
means connecting said receiving elements to said channels respectively,
a plurality of signal-storage devices,
means connecting said signal-storage devices in said channels respectively,
means responsive to a sea bed echo signal in a channel to set the signal-storage device in the channel into operation,
a delay device connected in each channel to delay echo signals in the channel before storage thereof,
means to trigger the storage devices in the several channels simultaneously to reproduce the signals stored therein,
a combining circuit,
and means connecting said combining circuit between said storage devices and said display apparatus to combine signals reproduced by said storage devices for application to said display apparatus.

3. Apparatus according to claim 2, wherein said storage devices comprise cathode ray tube stores.

4. Apparatus according to claim 2, wherein the delays provided by said delay devices are equal to one another.

5. Apparatus according to claim 2, wherein said display apparatus comprises a cathode ray tube.

6. In apparatus for detecting fish comprising
means for transmitting pulses of pressure waves into the sea beneath a vessel,
a receiving transducer system to receive echo signals from fish and the sea bed,
display apparatus,
and means connecting the display apparatus to said receiving transducer system to display indications of echoes from said fish and sea bed,
the provision of
a plurality of separate receiving channels,
a plurality of receiving elements in said receiving transducer system,
means connecting said receiving elements to said channels respectively,
a plurality of transmitting channels,
means coupling said receiving channels to said transmitting channels respectively,
a plurality of timing devices in said transmitting channels respectively,
means to trigger each said timing device from a datum in response to a sea bed echo signal in the associated receiving channel,
means to reverse all said timing devices simultaneously at a fixed time after the reception of the sea bed echo in the first of said channels to receive it,
and means in each transmitting channel responsive to the return of the timing device therein to said datum to transmit a pulse of pressure waves from the transmitting channel.

7. Apparatus according to claim 6, wherein said timing device comprises a charge and discharge circuit.

8. Apparatus according to claim 6, wherein said charge and discharge circuit has equal rates of charge and discharge.

9. Apparatus according to claim 6, wherein the receiving element in each receiving channel also constitutes a transmitting element in the corresponding transmitting channel.

10. Apparatus according to claim 6, wherein the display apparatus is connected to a selected group of at least one of said receiving elements.

11. A responder adapted to transmit a pulse of energy in a given direction in response to the reception of a pulse of energy from the given direction, comprising an array of receiving elements with associated receiving channels respectively coupled to corresponding transmitting channels, each transmitting channel including a timing device adapted to be triggered for operation from a datum condition by a signal received in the associated receiving channel, and to be reversed by a further signal delayed by a fixed time relative to the instant of reception of the said signal in the first channel to receive it, and means responsive to the return of the timing device in each transmitting channel to its datum condition to initiate the transmission of a pulse of energy from the transmitting channel.

References Cited by the Examiner
UNITED STATES PATENTS
2,839,735    6/58    Van Atta _____ 340—3

CHESTER L. JUSTUS, *Primary Examiner.*